United States Patent [19]

Takahashi et al.

[11] Patent Number: 4,846,539

[45] Date of Patent: Jul. 11, 1989

[54] Fθ LENS SYSTEM FOR USE IN LIGHT SCANNING DEVICE

[75] Inventors: Yasushi Takahashi, Iwate; Kenichi Takanashi, Yokohama, both of Japan

[73] Assignee: Ricoh Company, Ltd., Tokyo, Japan

[21] Appl. No.: 192,617

[22] Filed: May 11, 1988

[30] Foreign Application Priority Data

May 12, 1987 [JP] Japan .................... 62-144940
May 22, 1987 [JP] Japan .................... 62-125067

[51] Int. Cl.[4] .................. G02B 26/10; G02B 9/04; G02B 13/18
[52] U.S. Cl. .................. 350/6.8; 350/479; 350/433
[58] Field of Search .......... 350/6.1, 6.5, 6.6, 6.7, 350/6.8, 6.91, 474, 479, 433, 434

[56] References Cited

FOREIGN PATENT DOCUMENTS

| | | | |
|---|---|---|---|
| 0004019 | 1/1980 | Japan | 350/6.8 |
| 0068317 | 4/1985 | Japan | 350/6.8 |
| 0156033 | 8/1985 | Japan | 350/6.8 |
| 0194415 | 8/1986 | Japan | 350/6.8 |
| 0245129 | 10/1986 | Japan | 350/6.8 |

Primary Examiner—John K. Corbin
Assistant Examiner—Ronald M. Kachmarik
Attorney, Agent, or Firm—Oblon, Fisher, Spivak, McClelland & Maier

[57] ABSTRACT

An fθ lens system is disposed between a rotating polygonal mirror for deflecting a light beam and a surface being scanned, for focusing the light beam deflected by the rotating polygonal mirror on the surface. The fθ lens system places the reflecting position of the rotating polygonal mirror and the surface being scanned in conjugate relationship with respect to an auxiliary scanning direction, and has an fθ function, the fθ lens system comprising two lenses. The surfaces of the first and second lenses are defined as first through fourth surfaces successively from the rotating polygonal mirror toward the surface being scanned, the first surface being a spherical surface, the second surface being a cylindrical surface, the third surface being a cylindrical surface, and the fourth surface being a toric surface. The fθ lens system satisfies the conditions: $0.35 < R4x/R1x < 0.85$, and $-0.120 < (1/R3y) + (1/R4y) < -0.095$ where the Rix is the radius of curvatuve of the ith lens (i=1 through 4) in a plane in which the light beam is deflected by the rotating polygonal mirror, RiY is the radius of curvature of the ith lens in the auxiliary scanning direction, with the focal length fM of the fθ lens system in the main scanning direction being 100.

3 Claims, 10 Drawing Sheets

Fθ LENS SYSTEM FOR USE IN LIGHT SCANNING DEVICE

BACKGROUND OF THE INVENTION

The present invention relates to an fθ lens system for use in a light scanning device.

Light scanning devices are known as devices for writing or reading information by scanning a light beam. One such light scanning device includes a rotating polygonal mirror having a reflecting surface positioned near a focused linear image formed by a light beam emitted from a light source. The rotating polygonal mirror deflects the light beam at a constant angular velocity. The deflected light beam is focused as a light spot on a surface by a focusing lens system to scan the surface.

The light scanning device employing a rotating polygonal mirror has the problem of irregular deflecting surfaces which do not lie parallel to each other. Since the deflected light beam has a constant angular velocity, the surface should be scanned at a constant speed. An fθ lens system is a lens system designed optically to achieve scanning the surface at a constant speed.

One known scheme to correct such irregular reflecting surfaces employs an anamorphic lens system disposed between the rotating polygonal mirror and the surface being scanned, with the reflecting position of the rotating polygonal mirror and the surface being scanned being positioned in conjugate relation with respect to an auxiliary scanning direction of the surface being scanned.

Japanese Laid-Open Patent Publication No. 59-147316 discloses an anamorphic fθ lens system for effecting constant-speed scanning and solving the problem of irregular reflecting surfaces. The disclosed lens system cannot however produce a high-density light spot diameter because the curvature of field thereof is not sufficiently corrected in both main and auxiliary scanning directions.

SUMMARY OF THE INVENTION

In view of the aforesaid disadvantages of the conventional fθ lens system, it is an object of the present invention to provide an fθ lens system which can well correct the problem of irregular reflecting surfaces of a light deflector, can well correct the curvature of field in both main and auxiliary scanning directions, can produce a focused beam image having a very small width, and hence can form a high-density light spot diameter.

According to the present invention, there is provided an fθ lens system in a light scanning device which has means for focusing a light beam emitted from a light source unit as a linear image, and a rotating polygonal mirror having a reflecting surface near the focused linear image for deflecting the light beam at a constant angular velocity, for focusing the deflected light beam as a light spot on a surface to scan the latter with the light spot.

The fθ lens system places the reflecting position of the rotating polygonal mirror and the surface being scanned in conjugate relationship with respect to an auxiliary scanning direction, and has an fθ function. The fθ lens system comprises first and second lenses successively positioned in the named order from the rotating polygonal mirror toward the surface being scanned.

The first lens comprises a single anamorphic lens having a first spherical surface an a second cylindrical surface and also having negative refractive power, the second lens comprising a single anamorphic lens having a first cylindrical surface and a second toric surface and also having positive refractive power, the surfaces of the first and second lenses being defined as first through fourth lenses successively from the rotating polygonal mirror toward the surface being scanned, the fθ lens system satisfying the following conditions:

(I) $0.35 < R4x/R1x < 0.85$
(II) $-0.120 < (1/R3y) + (1/R4y) < -0.095$ where Rix is the radius of curvature of the ith lens (i=1 through 4) in a plane in which the light beam is deflected by the rotating polygonal mirror, RiY is the radius of curvature of the ith lens in the auxiliary scanning direction, with the focal length fM of the fθ lens system in the main scanning direction being 100.

More specifically, Rix is a component of the radius of curvature in a cross section parallel to the light deflecting plane, whereas Riy is a component of the radius of curvature in a cross section including the optical axis of the lens and normal to the light deflecting plane.

The light deflecting plane is a plane formed by sweeping the principal ray of the ideal light beam deflected by the rotating polygonal mirror. A plane normal to the light deflecting plane, as referred to hereinafter, contains the optical axis of the lens system.

The first lens has a cross-sectional shape as a plano-concave lens in the light deflecting plane, and a cross-sectional shape as a double concave lens in the plane normal to the light deflecting plane. The second lens has a cross-sectional shape as a plano-convex lens in the light deflecting plane, and a cross-sectional shape as a meniscus lens in the plane normal to the light deflecting plane.

The above conditions (I), (II) are described below. The condition (I) serves to keep the curvature of field in the main scanning direction and linearity, i.e., the fθ characteristics in a good range. If the range of the condition (I) were exceeded, the curvature of field and the fθ characteristics would not sufficiently be corrected.

The condition (II) serves to well correct the curvature of field in the auxiliary scanning direction. If the range of the condition (II) were exceeded, the curvature of field in the auxiliary scanning direction would not sufficiently be corrected.

The ranges of the above conditions vary dependnet on the deflection angle θ of the light scanning device employing the fθ lens system.

When $2\theta$ is in the range of 64° to 65°, a good lens system can be achieved if $R4x/R1x$ and $(1/R3y)+(1/R4y)$ meet the conditions:
(I) $0.35 < R4x/R1x < 0.7$
(II) $-0.115 < (1/R3y)+(1/R4y) < -0.095$ When $2\theta$ is 45°, $R4x/R1x$ and $(1/R3y)+(1/R4y)$ should preferably meet the conditions:
(I) $0.40 < R4x/R1x < 0.85$
(II) $-0.120 < (1/R3y)+(1/R4y) < -0.100$ The fθ lens system of the present invention, as constructed above, has small curvatures of field in both main and auxiliary scanning directions, and hence can produce a high-density light spot. The fθ lens system has good fθ characteristics and can well correct the problem of irregular reflecting surfaces of the rotating polygonal mirror. Since the fθ lens system is composed of two lenses and does not employ an elongate cylindrical lens, it is compact and low in cost.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
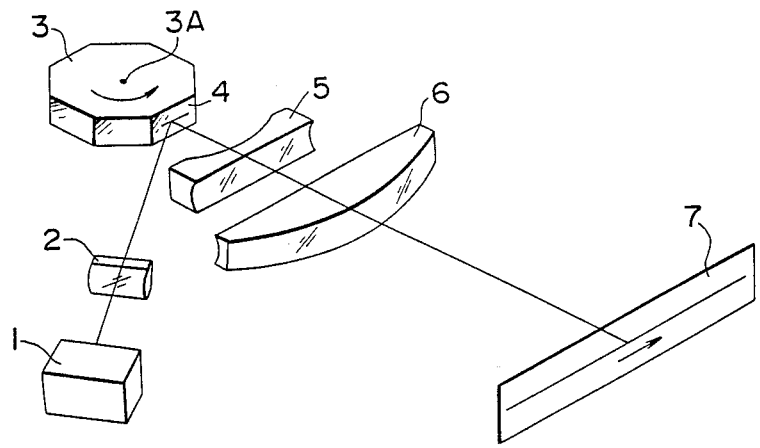
FIG. 1 is a schematic perspective view of a light scanning device incorporating an fθ lens system according to the present invention.
Figure 2:
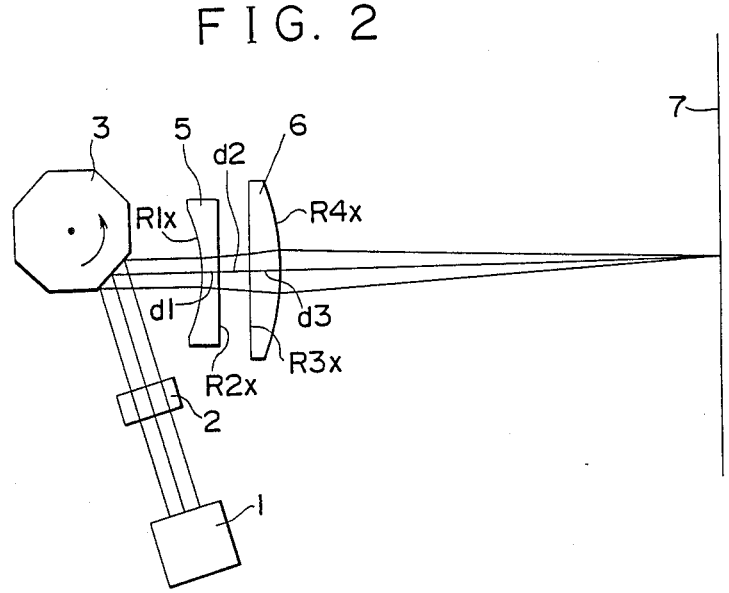
FIG. 2 is a view showing the manner in which a light beam travels in a light deflecting plane in the optical arrangement shown in FIG. 1.

FIG. 1 schematically shows a light scanning device employing an fθ lens system according to the present invention. FIG. 2 shows the manner in which a light beam travels in a light deflecting plane in the optical arrangement of FIG. 1 as viewed in an auxiliary scanning direction.

A light source unit 1 comprising a light source or a light source and a condenser emits a parallel-ray light beam which passes through a linear image focusing optical system 2 comprising a cylindrical lens which forms a linear image near a reflecting surface 4 of a rotating polygonal mirror 3.

The light beam reflected by the rotating polygonal mirror 3 is focused as a light spot on a surface 7 being scanned, by an fθ lens system according to the present invention. As the rotating polygonal mirorr 3 rotates at a constant speed in the direction of the arrow, the light beam scans the surface 7 at a constant speed in a main scanning direction.

Figure 3:
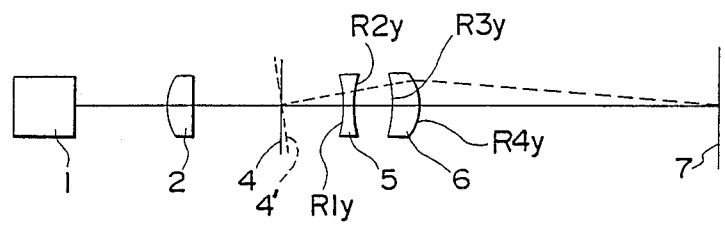
FIG. 3 is a view explaining correction of the problem of irregular reflecting surfaces.

The fθ lens system comprises a first lens 5 and a second lens 6. The first lens 5 is positioned closer to the rotating polygonal mirror 3 and the second lens 6 is positioned closer to the surface 7 being scanned. In a plane in which the light beam is deflected by the rotating polygonal mirror, the fθ lens system places the infinity on the side of the light source unit 1 and the position on the scanned surface 7 in conjugate relationship, as shown in FIG. 2. In a plane normal to the light beam deflecting plane, the fθ lens system positions the reflecting surface of the polygonal mirror 3 and the scanned surface 7 in substantially conjugate relationship. Therefore, as shown in FIG. 3, even if the reflecting surface 4 is an irregular or inclined surface 4', the position on the scanned surface 7 where the light beam is focused by the fθ lens system is not virtually displaced in the auxiliary scanning direction. Therefore, the problem of irregular reflecting surfaces of the rotating polygonal mirror 3 is eliminated.

Figure 4:
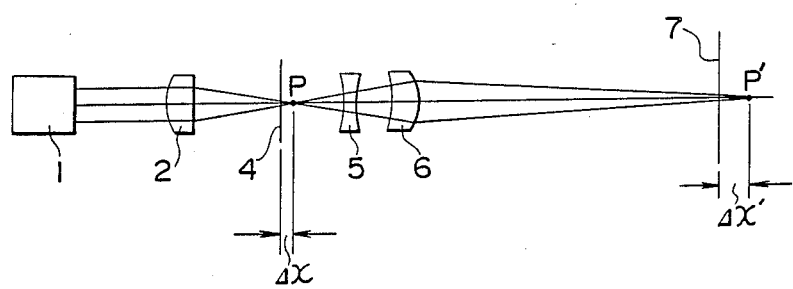
FIGS. 4 through 7 are views explaining the need of correction of the field of curvature.

When the polygonal mirror 3 is rotated, the reflecting surface thereof is rotated about an axis 3A (FIG. 1). Therefore, as shown in FIG. 4, there is developed a positional misalignment or deviation ΔX between the position P where the linear image is focused and the reflecting surface 4 upon rotation of the reflecting surface 4. Such a positional deviation ΔX causes the position P' of the conjugate linear image formed by fθ lens system to be displaced ΔX' from the scanned surface 7.

As is well known, the amount of displacement ΔX' is given as $\Delta X' = \beta^2 \Delta X$ where $\beta$ is the lateral magnification of the fθ lenssystem in the auxiliary scanning direction.

Figure 5:
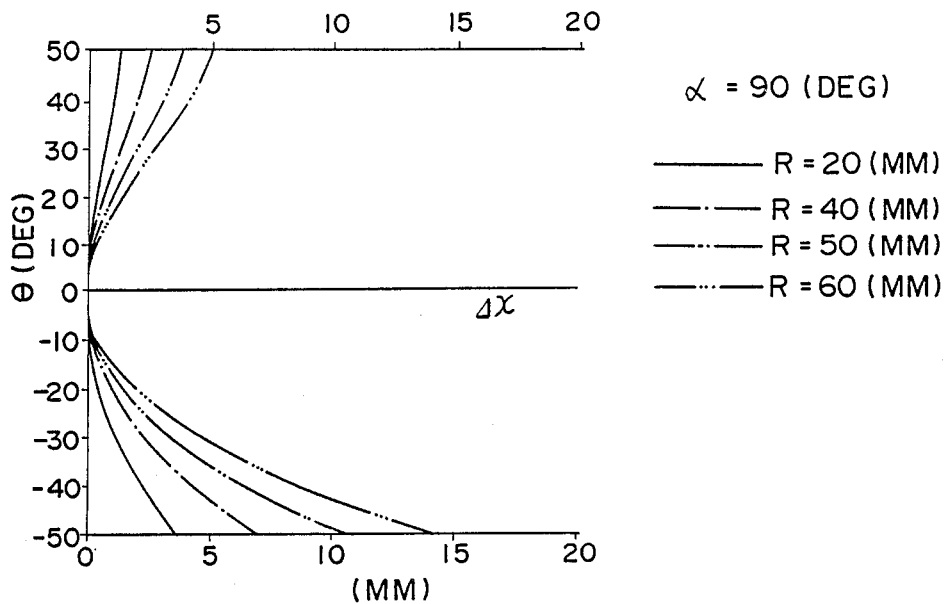
Figure 6:
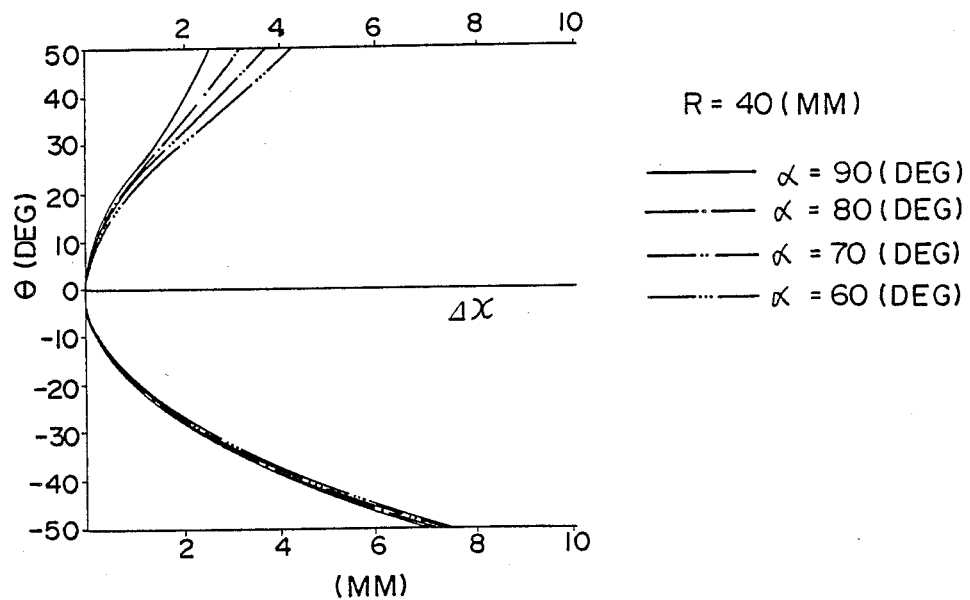
Figure 8:
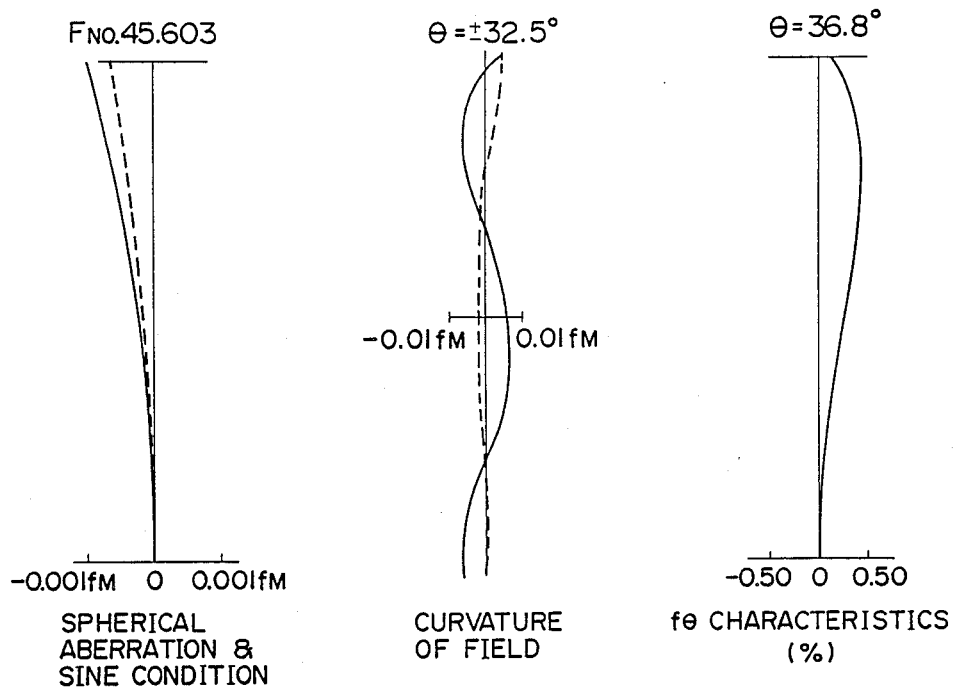
FIG. 8 is an aberration diagram of EXAMPLE 1 of the present invention.
Figure 9:
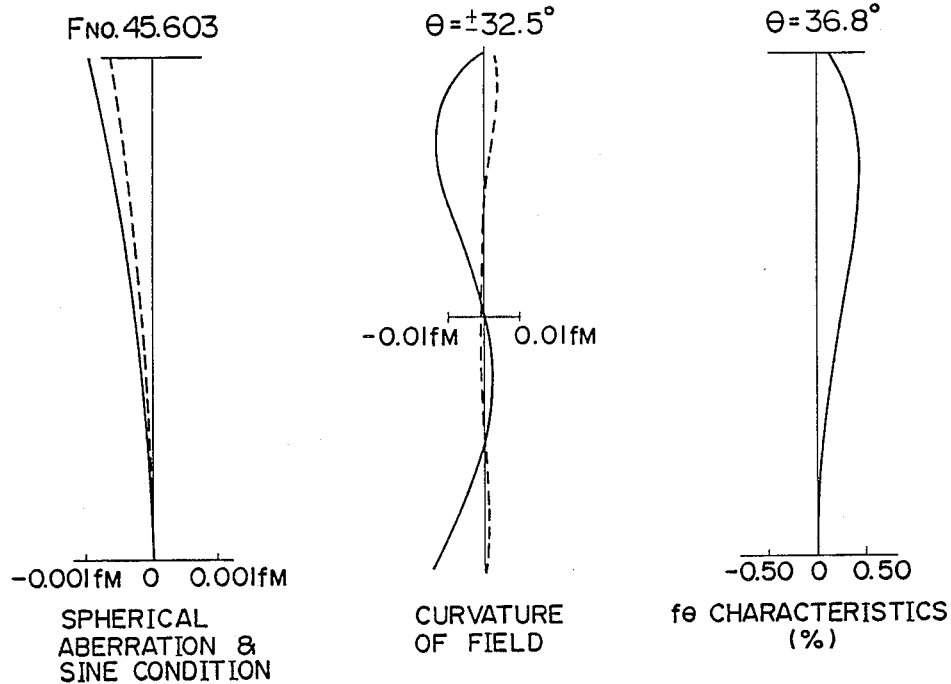
FIG. 9 is an aberration diagram of EXAMPLE 2 of the present invention.
Figure 10:
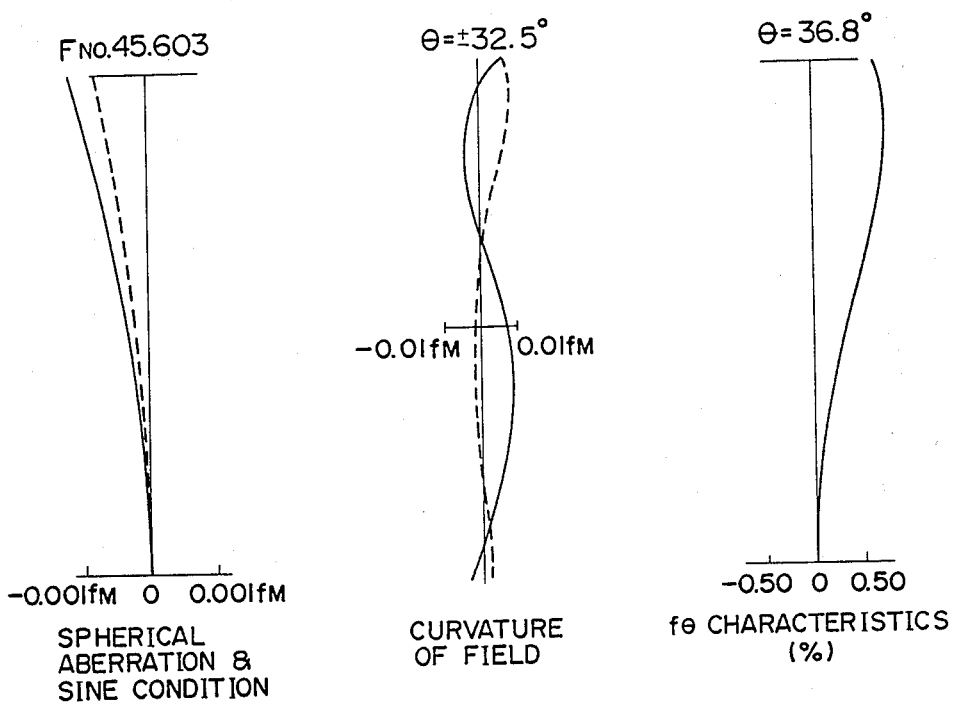
FIG. 10 is an aberration diagram of EXAMPLE 3 of the present invention.
Figure 11:
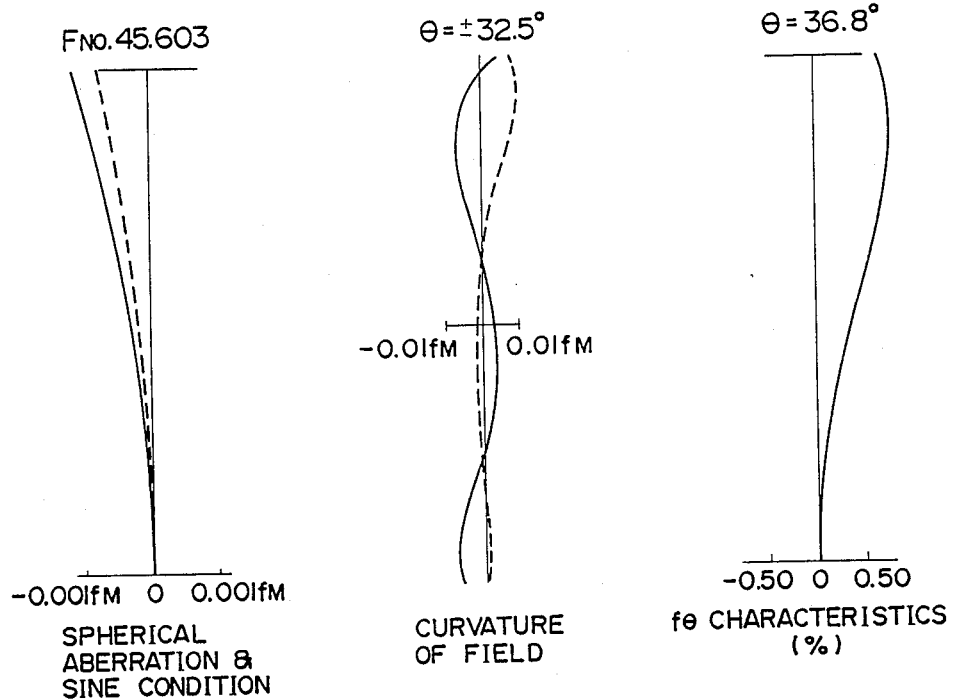
FIG. 11 is an aberration diagram of EXAMPLE 4 of the present invention.
Figure 12:
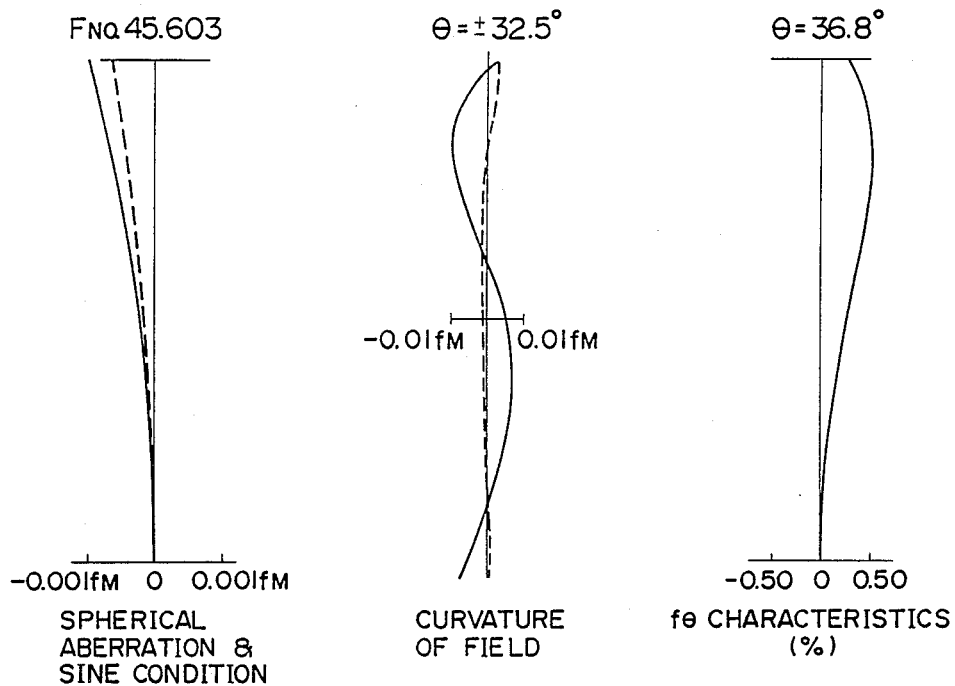
FIG. 12 is an aberration diagram of EXAMPLE 5 of the present invention.
Figure 13:
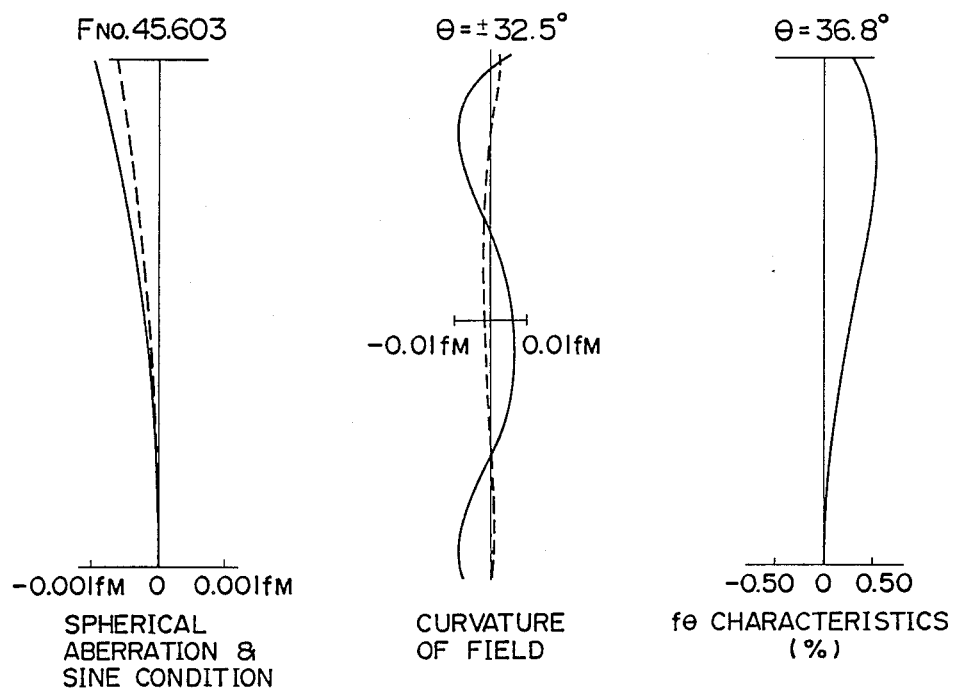
FIG. 13 is an aberration diagram of EXAMPLE 6 of the present invention.

With the angle between the optical axis of the fθ lens system and the principal ray of the deflected lighg beam in the light deflecting plane being indicated by $\theta$, the relationship between $\theta$ and ΔX is shown in FIGS. 5 and 6.

In FIG. 5, the curves are plotted when an incident angle $\alpha$ is 90 degrees, with the radius R of a circle inscribed in the rotating polygonal mirror 3 being used as a parameter. In FIG. 6, the curves are plotted when radius R of the circle inscribed in the rotating polygonal mirror 3 is 40 mm, with the incident angle $\alpha$ being used as a parameter.

Study of FIGS. 5 and 6 indicates that ΔX is greater as the radius R is larger and the incident angle $\alpha$ is smaller.

The relative positional deviation between the linear image position and the reflecting surface, caused upon rotation of the reflecting surface, is developed two-dimensionally in the light deflecting surface, and is moved asymmetrically with respect to the optical axis of the fθ lens system.

Therefore, the light scanning device as shown in FIG. 1 is required to well correct the curvature of field, in both main and auxiliary scanning directions, of the fθ lens system. The fθ characteristics should also be well corrected in the main scanning direction.

Figure 7:
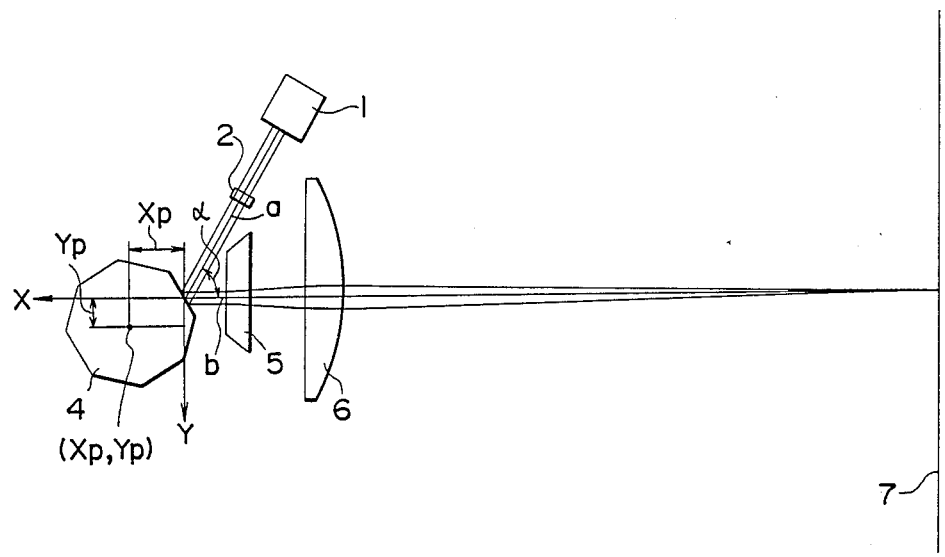

The incident angle $\alpha$ will be described below. In FIG. 7, the reference character a indicates the principal ray of the light beam applied to the rotating polygonal mirror 3 and the reference character b indicates the principal ray of the light beam reflected by the rotating polygonal mirror 3 parallel to the optical axis of the fθ lens system. X- and Y-axes are determined with the point of intersection of the principal rays a, b being used as the origin, and it is assumed that the axis about which the polygonal mirror 3 rotates is positioned at coordinates Xp, Yp.

The incident angle $\alpha$ is defined as an angle at which the principal rays a, b intersect as shown.

In order to minimize a change in the positional deviation ΔX between the linear image position and the reflecting surface, the coordinates Xp, Yp should be selected to meet the conditions:

$0 < Xp < R\cos(\alpha/2)$, and
$0 < Yp < R\sin(\alpha/2)$, as is well known in the art.

EXAMPLES 1 through 13 of the present invention will be given below.

In each of EXAMPLES 1 through 13, fM represents the combined focal length of the fθ lens system with respect to the main scanning direction, fM being selected to be 100, fS represents the combined focal length of the fθ θ lens system in the plane normal to the light deflecting plane, i.e., with respect to the auxiliary scanning direction, θ indicates the angle through which the light is deflected, α the indicent angle, and R the radius of a circle inscribed in the rotating polygonal mirror.

Furthermore, Rix indicates the radius of curvature in the light deflecting plane of an ith lens as counted from the rotating polygonal mirror, Riy the radius of curvature in the plane normal to the light deflecting plane of the ith lens, di the distance between the surfaces of the ith lens, and ni the refractive index of the ith lens.

In addition, $K1 = R4x/R1x$, and $K2 = (1/R3y) + (1/R4y)$.

EXAMPLE 1 fM = 100, fS = 22.135, 2θ = 65°, α = 60°,
R/fM = 0.151, K1 = 0.423, K2 = −0.101

| i | Rix | Riy | di | ni |
|---|---|---|---|---|
| 1 | −107.774 | −107.774 | 5.672 | 1.71221 |
| 2 | ∞ | 61.412 | 10.966 | 1.675 |
| 3 | ∞ | −61.412 | 6.807 | |
| 4 | −45.569 | −11.855 | | |

EXAMPLE 2 fM = 100, fS = 21.350, 2θ = 65°, α = 60°,
R/fM = 0.113, K1 = 0.423, K2 = −0.111

| i | Rix | Riy | di | ni |
|---|---|---|---|---|
| 1 | −107.774 | −107.774 | 5.672 | 1.71221 |
| 2 | ∞ | 6.705 | 10.966 | 1.675 |
| 3 | ∞ | −68.068 | 6.807 | |
| 4 | −45.569 | −10.399 | | |

EXAMPLE 3 fM = 100, fS = 22.241, 2θ = 65°, α = 60°,
R/fM = 0.132, K1 = 0.455, K2 = −0.109

| i | Rix | Riy | di | ni |
|---|---|---|---|---|
| 1 | −89.623 | −89.623 | 5.181 | 1.60909 |
| 2 | ∞ | 16.261 | 10.966 | 1.60909 |
| 3 | ∞ | −75.631 | 6.429 | |
| 4 | −40.744 | −10.395 | | |

EXAMPLE 4 fM = 100, fS = 21.791, 2θ = 65°, α = 60°,
R/fM = 0.132, K1 = 0.455, K2 = −0.108

| i | Rix | Riy | di | ni |
|---|---|---|---|---|
| 1 | −89.623 | −89.623 | 5.181 | 1.60909 |
| 2 | ∞ | 63.53 | 10.966 | 1.76605 |
| 3 | ∞ | −63.53 | 6.429 | |
| 4 | −40.744 | −10.83 | | |

EXAMPLE 5 fM = 100, fS = 21.271, 2θ = 65°, α = 60°,
R/fM = 0.132, K1 = 0.654, K2 = −0.102.

| i | Rix | Riy | di | ni |
|---|---|---|---|---|
| 1 | −71.849 | −71.849 | 7.185 | 1.60909 |
| 2 | ∞ | 16.45 | 7.185 | 1.76605 |
| 3 | ∞ | −68.068 | 7.185 | |
| 4 | −46.983 | −11.405 | | |

EXAMPLE 6 fM = 100, fS = 20.576, 2θ = 65°, α = 60°,
R/fM = 0.132, K1 = 0.654, K2 = −0.101

| i | Rix | Riy | di | ni |
|---|---|---|---|---|
| 1 | −71.849 | −71.849 | 7.185 | 1.60909 |
| 2 | ∞ | 55.4 | 7.185 | 1.76605 |
| 3 | ∞ | −55.4 | 7.185 | |
| 4 | −46.983 | −11.995 | | |

EXAMPLE 7 fM = 100, fS = 21.774, 2θ = 64°, α = 60°,
R/fM = 0.112, K1 = 0.481, K2 = −0.108

| i | Rix | Riy | di | ni |
|---|---|---|---|---|
| 1 | −95.169 | −95.169 | 4.319 | 1.71221 |
| 2 | ∞ | 18.792 | 10.016 | 1.71221 |
| 3 | ∞ | −55.851 | 6.59 | |
| 4 | −45.732 | −11.114 | | |

EXAMPLE 8 fM = 100, fS = 21.313, 2θ = 64°, α = 60°,
R/fM = 0.112, K1 = 0.481, K2 = −0.107

| i | Rix | Riy | di | ni |
|---|---|---|---|---|
| 1 | −95.169 | −95.169 | 4.319 | 1.71221 |
| 2 | ∞ | ∞ | 10.016 | 1.71221 |
| 3 | ∞ | −45.797 | 6.59 | |
| 4 | −45.732 | −11.744 | | |

EXAMPLE 9 fM = 100, fS = 19.674, 2θ = 54°, α = 60°,
R/fM = 0.094, K1 = 0.802, K2 = −0.106

| i | Rix | Riy | di | ni |
|---|---|---|---|---|
| 1 | −54.035 | −54.035 | 7.320 | 1.56195 |
| 2 | ∞ | 8.796 | 6.597 | 1.76605 |
| 3 | ∞ | −94.248 | 6.283 | |
| 4 | −43.348 | −10.505 | | |

EXAMPLE 10

| | fM = 100, fS = 20.906, 2θ = 54°, α = 60°, R/fM = 0.094, K1 = 0.802, K2 = −0.105 | | | |
|---|---|---|---|---|
| i | Rix | Riy | di | ni |
| 1 | −54.035 | −54.035 | 7.320 | 1.56195 |
| 2 | ∞ | 13.195 | 6.597 | 1.76605 |
| 3 | ∞ | −78.540 | 6.283 | |
| 4 | −43.348 | −10.879 | | |

EXAMPLE 11

| | fM = 100, fS = 21.367, 2θ = 54°, α = 60°, R/fM = 0.094, K1 = 0.468, K2 = −0.115 | | | |
|---|---|---|---|---|
| i | Rix | Riy | di | ni |
| 1 | −86.394 | −86.394 | 4.084 | 1.60909 |
| 2 | ∞ | 6.563 | 12.723 | 1.60909 |
| 3 | ∞ | −72.257 | 5.655 | |
| 4 | −40.452 | −9.927 | | |

EXAMPLE 12

| | fM = 100, fS = 20.271, 2θ = 54°, α = 60°, R/fM = 0.094, K1 = 0.468, K2 = −0.117 | | | |
|---|---|---|---|---|
| i | Rix | Riy | di | ni |
| 1 | −86.394 | −86.394 | 4.084 | 1.60909 |
| 2 | ∞ | 4.750 | 12.723 | 1.60909 |
| 3 | ∞ | −73.827 | 5.655 | |
| 4 | −40.452 | −9.676 | | |

EXAMPLE 13

| | fM = 100, fS = 21.605, 2θ = 54°, α = 60°, R/fM = 0.094, K1 = 0.412, K2 = −0.115 | | | |
|---|---|---|---|---|
| i | Rix | Riy | di | ni |
| 1 | −100.531 | −100.531 | 4.084 | 1.6594 |
| 2 | ∞ | 9.205 | 13.352 | 1.60909 |
| 3 | ∞ | −62.832 | 5.341 | |
| 4 | −41.397 | −10.053 | | |

Figure 14:
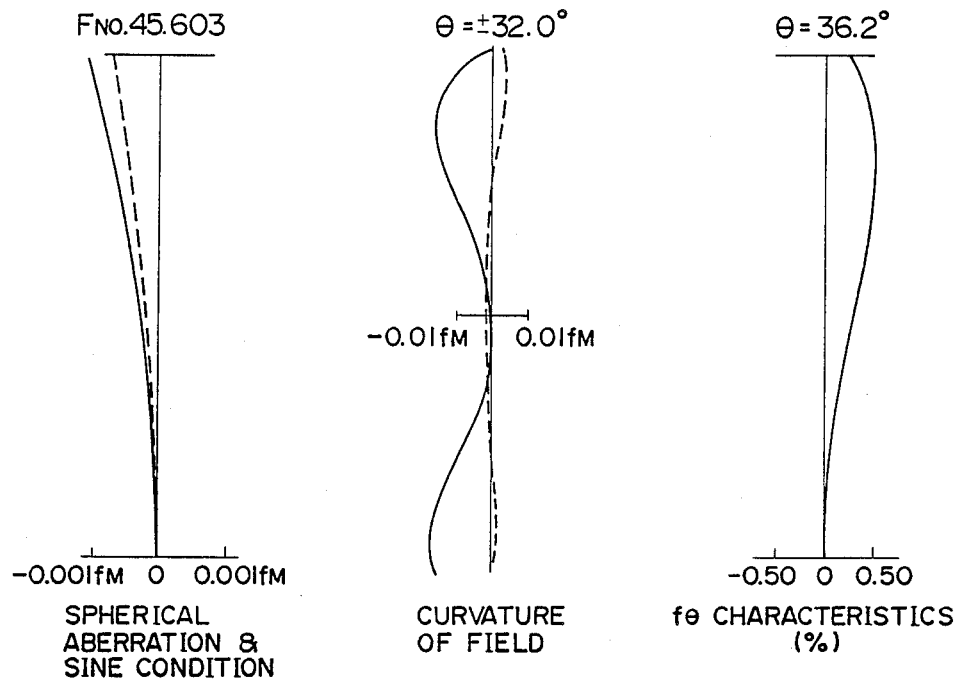
FIG. 14 is an aberration diagram of EXAMPLE 7 of the present invention.
Figure 15:
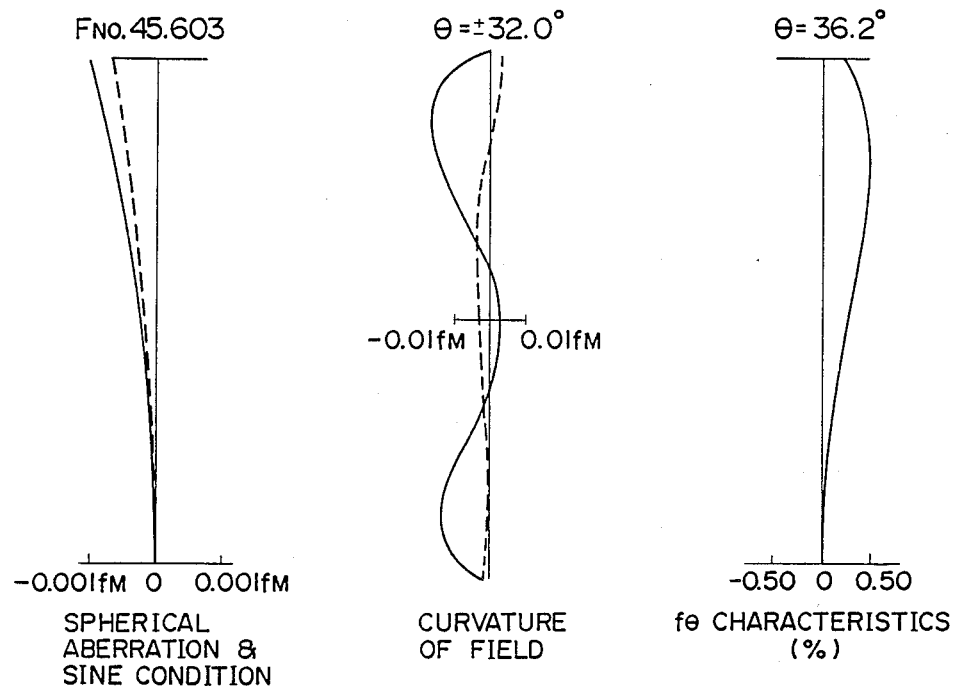
FIG. 15 is an aberration diagram of EXAMPLE 8 of the present invention.
Figure 16:
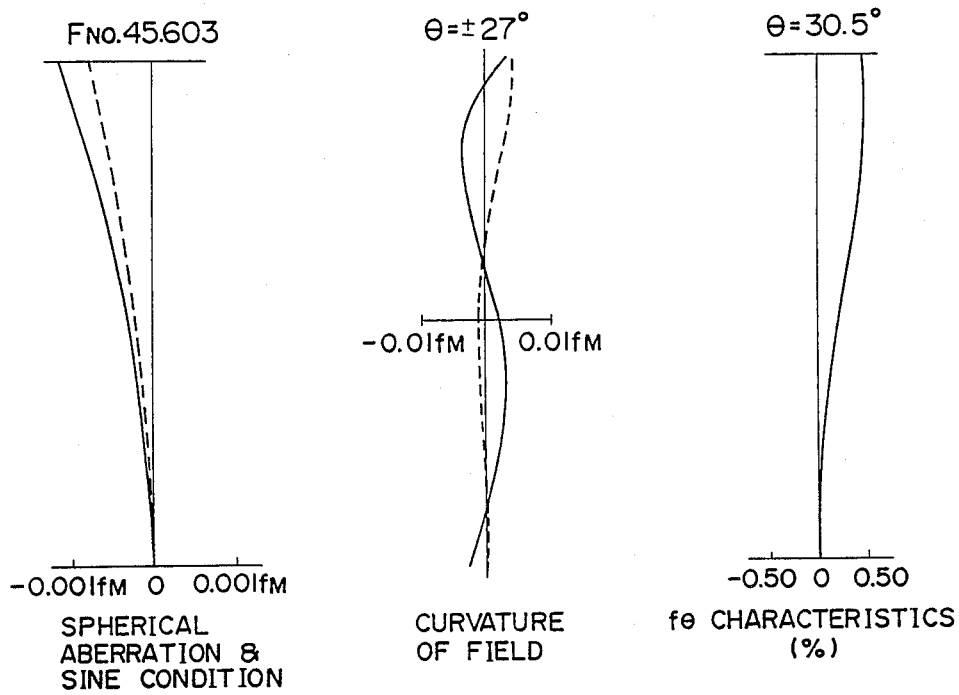
FIG. 16 is an aberration diagram of EXAMPLE 9 of the present invention.
Figure 17:
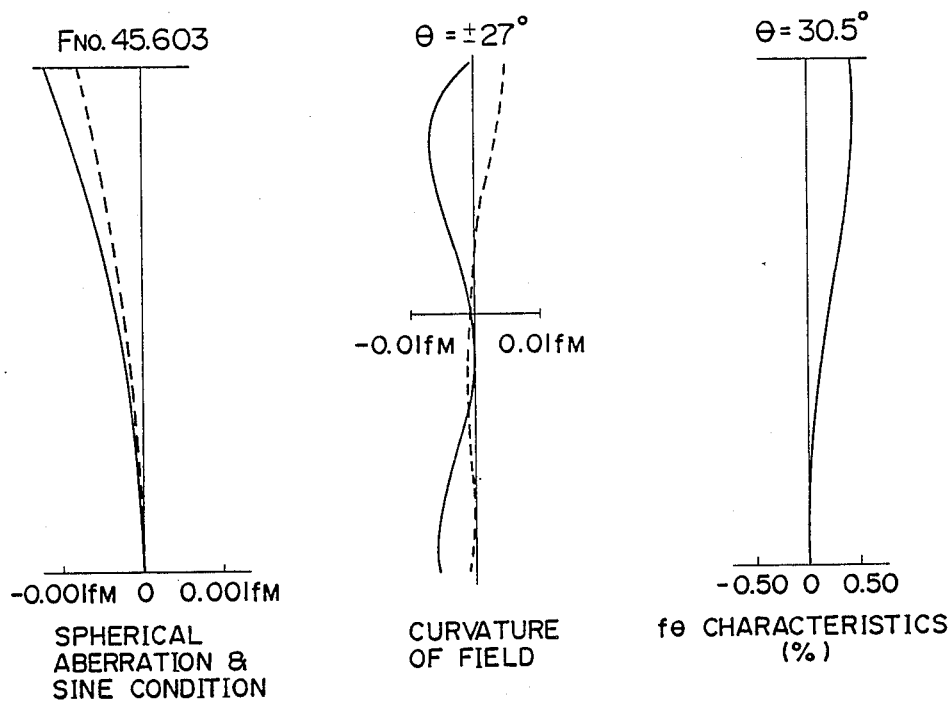
FIG. 17 is an aberration diagram of EXAMPLE 10 of the present invention.
Figure 18:
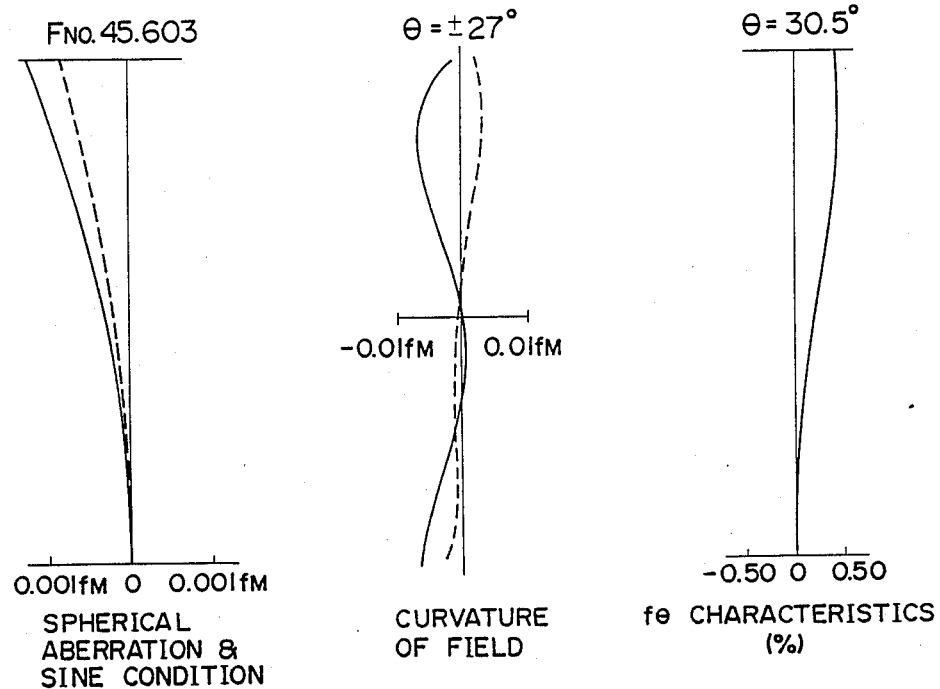
FIG. 18 is an aberration diagram of EXAMPLE 11 of the present invention.
Figure 19:
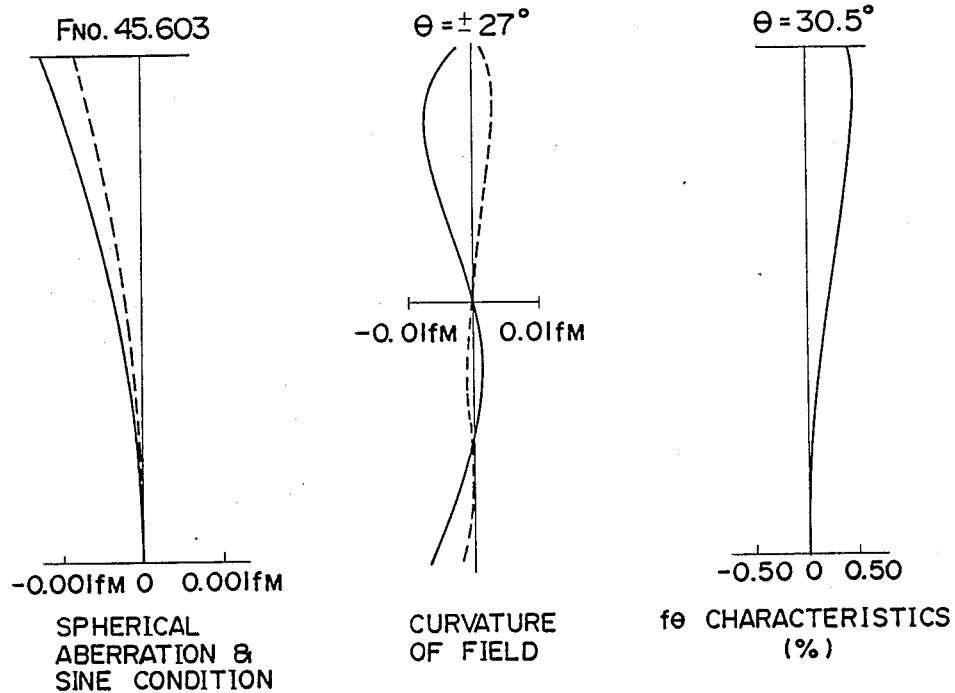
FIG. 19 is an aberration diagram of EXAMPLE 12 of the present invention.
Figure 20:
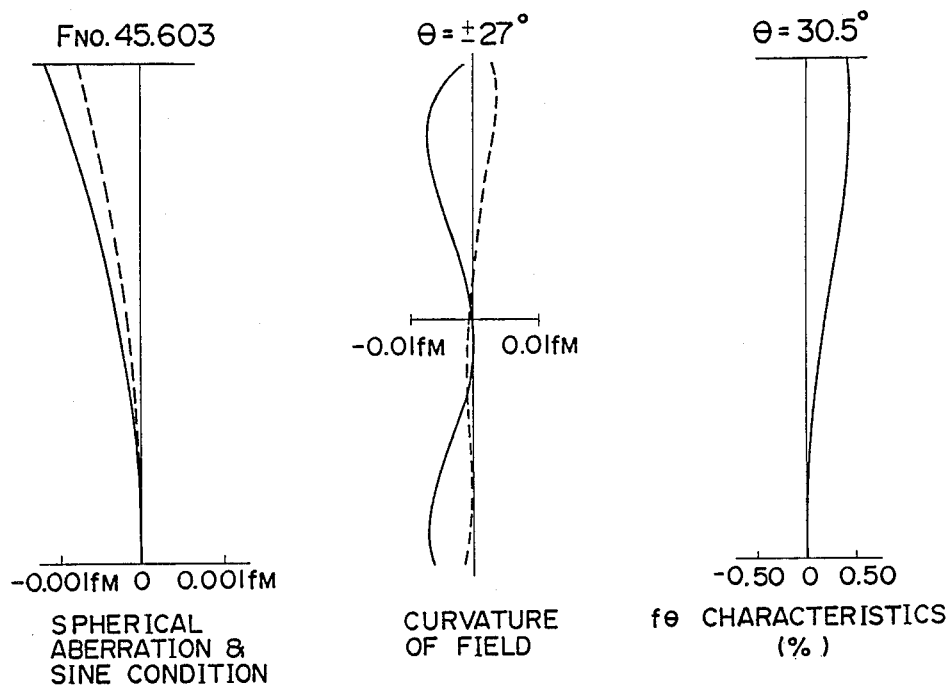
FIG. 20 is an aberration diagram of EXAMPLE 13 of the present invention.

FIGS. 8 through 20 show aberrations of the Fθ lens systems according to EXAMPLE 1 through 13, respectively. However, fM=264.442 in FIGS. 8 through 13, fM=268.547 in FIGS. 14 and 15, and fM=318.31 in FIGS. 16 through 20.

As is well known in the art, the fθ characteristics is an amount which is defined by:

$$\{(h' - f\cdot\theta)/(f\cdot\theta)\} \times 100\%$$

where fθ is an ideal image height and h' is an actual image height.

In each of the aberration diagrams of FIG. 8 through 20, the spherical aberration is indicated by a solid line and the sine condition is indicated by a broken line, the spherical aberration and the sine condition being given with respect to the main scanning direction. The curvature of field is shown throughout the entire deflection range as it is asymmetric due to variations in the reflecting position of the rotating polygonal mirror. The solid line curve for the curvature of field indicates the focused position with respect to the auxiliary scanning direction, and the broken line curve for the curvature of field indicates the focused position with respect to the main scanning direction.

Although a certain preferred embodiment has been shown and described, it should be understood that many changes and modifications may be made therein without departing from the scope of the appended claims.

What is claimed is:

1. An fθ lens system in a light scanning device which has means for focusing a light beam emitted from a light source unit as a linear image, and a rotating polygonal mirror having a reflecting surface near the focused linear image for deflecting the light beam at a constant angular velocity, for focusing the deflected light beam as a light spot on a surface to scan the latter with the light spot, said fθ lens system placing the reflecting position of the rotating polygonal mirror and the surface being scanned in conjugate relationship with respect to an auxiliary scanning direction, and having an fθ function, said fθ lens system comprising first and second lenses successively positioned in the named order from said rotating polygonal mirror toward said surface being scanned, said first lens comprising a single anamorphic lens having a first spherical surface and a second cylindrical surface and also having negative refractive power, said second lens comprising a single anamorphic lens having a first cylindrical surface and a second toric surface and also having positive refractive power, the surfaces of said first and second lenses being defined as first through fourth surfaces successively from said rotating polygonal mirror toward said surface being scanned, said fθ lens system satisfying the following conditions:

(I) $0.35 < R4x/R1x < 0.85$ (II) $-0.120 < (1/R3y) + (1/R4y) < -0.095$ where Rix is the radius of curvature of the ith lens (i=1 through 4) in a plane in which the light beam is deflected by the rotating polygonal mirror, RiY is the radius of curvature of the ith lens in the auxiliary scanning direction, with the focal length fM of the fθ lens system in the main scanning direction being 100.

2. An fθ lens system according to claim 1, wherein R4x/R1x and (1/R3y)+(1/R4y) meet the conditions:

(I) $0.35 < R4x/R1x < 0.7$ (II) $-0.115 < (1/R3y) + (1/R4y) < -0.095$

3. An fθ lens system according to claim 1, wherein R4x/R1x and (1/R3y)+(1/R4y) meet the conditions:

(I) $0.40 < R4x/R1x < 0.85$ (II) $-0.120 < (1/R3y) + (1/R4y) < -0.100$.

* * * * *